Aug. 24, 1943.   W. C. EDDY   2,327,700
OPTICAL IMAGE REVERSING AND/OR INVERTING SYSTEM
Filed July 23, 1941
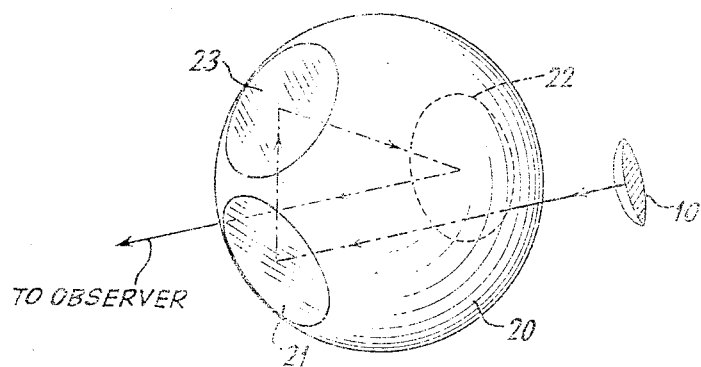
INVENTOR.
WILLIAM C. EDDY
BY
ATTORNEY.

Patented Aug. 24, 1943

2,327,700

UNITED STATES PATENT OFFICE 2,327,700

OPTICAL IMAGE REVERSING AND/OR INVERTING SYSTEM

William C. Eddy, Chicago, Ill., assignor to Radio Corporation of America, a corporation of Delaware Application July 23, 1941, Serial No. 403,653

4 Claims. (Cl. 88—1.5)

My invention relates, in general, to optical systems and more particularly to such systems as are used to reverse and/or invert an optical image.

Reversal and/or inversion of an optical image may be accomplished by the use of lens systems or other focusing devices. Amongst the disadvantages attendant the use of such systems of the prior art is the fact that they operate to definitely focus an image, a result which is not always desirable, and also the fact that a great deal of light is lost in the passage of the optical image through this medium. Accordingly, it is one of the objects of my invention to provide an arrangement for inverting and/or reversing a virtual or real optical image without resorting to the use of lens systems or other focusing devices.

In the present practice of television, the cameras used in the art have a view finding arrangement which usually comprises a ground glass screen positioned co-planarly with respect to the photo-electric mosaic of the scanning tube in the camera. A pair of lenses having equal focal lengths are mounted substantially co-planarly, one of which is used for focusing the camera. This means that unless intermediate optical lens systems are used, the image on the ground glass screen is inverted and reversed. Such television camera arrangements are illustrated, for instance, in the United States patent to Bedford et al. No. 2,162,908, granted June 20, 1939. This also means that in "tilting" or "panning" the camera the operator suffers from the disadvantage that the "tilt" or "pan" is opposite to the direction in which the image changes on the ground glass viewing screen. If an intermediate lens system were used the camera operator would have to be constantly cognizant of whether or not the lens system were accurately adjusted, in addition to the other disadvantages of using a focusing type of device. Accordingly, it is another of the objects of my invention to provide an arrangement which will reverse and/or invert an optical image, and which may be used in conjunction with a television camera.

In devices of the kind to be explained more fully hereinafter, it is important that the apparatus be simple, accurate, and easy to maintain in adjustment. Accordingly, it is another of the objects of my invention to provide an apparatus of the nature hereinafter to be described for inverting and/or reversing an optical image which may be simple, accurate, and easy to maintain in adjustment.

In addition, it is also desirable that systems of the nature of the general class to which this invention belongs should be efficient from an optical standpoint. Accordingly, it is another of the objects of my invention to provide an arrangement which will fulfill these requirements.

My invention in general contemplates the use of a plurality of reflecting surfaces such as mirrors positioned so as to reflect one to another, the optical image being impressed onto and reflected from one of said mirrors or reflectors along a definite optical path to another of said reflectors, whereby reversal of the image may be accomplished. If the reflecting surfaces are definitely related each to the other in position in so far as their angular positioning with respect to two axes of projection at right angles to each other is concerned, then inversion as well as reversal of the image may be accomplished. In one embodiment of the invention reflecting surfaces form the facets of a prism which may be in the form of a ball, and hence all reflection takes place within the prism itself, thus minimizing relative adjustments and such things as the effect of dust and the like, as well as maintaining a high optical efficiency.

My invention will best be understood by reference to the drawing, of which the single figure represents schematically a faceted prism arrangement for accomplishing inversion and reversal of an image.

Referring now to the drawing, the ball or solid body 20 formed as a solid of revolution has facets 21, 22 and 23 cut in the face or outer surface thereof. These facets may bear a predetermined angular relationship relative to each other and provide an arrangement such that all reflection takes place internally in the ball. It is well known that the inner face of a prism may be made a totally reflecting surface by preventing escape of light through the face, such, for instance, as by painting the outer side of the face black. In the arrangement shown, the lens member 10 may, for instance, be the view finder lens on a television camera and is arranged to direct the light passing therethrough upon the first reflecting surface 21, for instance, from, which the light follows the path of the indicated arrows and emerges along the direction marked "to observer." In the arrangement shown, it is important that each of the facets is positioned relative to the other in predetermined angular relationship, and that each of the surfaces 21, 22 and 23, for instance, is planar and of an area less than that of any section along a major axis of the solid. It will be appreciated that this forms a very simple arrangement in which no relative adjustment of the reflecting surfaces need ever be made with respect to each other, and also in which the effects of such extraneous matter as dust and the like are prevented. Also, a very important element is the fact that the light transmission efficiency of such an arrangement is very high, particularly in pure optical glass, and taking into consideration the lack of refractions in such a system. In addition, there is no refraction other than that which is self-compensatory, and there is no wear and tear on the optical system. An additional facet of the ball, which may, for instance, be a crystal ball, may be sand blasted in order to create a ground glass viewing screen, or can be chemically etched for the same purpose. A light transmission efficiency of 98%, for instance, can be obtained with a faceted crystal ball, in contradistinction to other arrangements where the light losses may be fairly large. The arrangement disclosed is such that the image will appear to the observer reversed and inverted with respect to the image that is passed from the lens 10.

It will be appreciated that there may be departures from the specific showings illustrated hereinbefore which may fall fairly within the spirit and scope of the present invention, and accordingly I am not limited except as defined in the hereinafter appended claims.

What I claim is:

1. An optical device comprising a solid body formed as a solid of revolution, said body having a plurality of facets formed on the outer surface thereof, each of said facets being positioned in a predetermined angular relationship relative to each other and each formed as a planar surface of an area less than that of any section along a major axis of the solid, said solid also having a substantially planar surface through which entering light may be directed therein to impinge successively upon the light reflecting facets so as to reverse and invert the entering optical image rays, said spherical surface also having a planar surface at which a reversed and inverted image of the entering optical image is adapted to emerge.

2. An optical device comprising a solid spherical body, said body having a plurality of facets formed on the outer surface thereof, each of said facets being positioned in a predetermined angular relationship relative to each other, and each facet being formed as a planar surface which is bounded by a small circle of the sphere, said spherical body also having a substantially planar surface through which entering light may be directed internally of the body to strike the facets successively and sequentially so as to reverse and invert the entering optical image rays, said spherical body also having a planar surface through which a reversed and inverted image of the entering optical image is adapted to emerge.

3. The combination claimed in claim 2 comprising, in addition, a coating upon the last named planar surface to provide a viewing screen whereat the image is viewed.

4. The combination claimed in claim 2 comprising, in addition, a reflecting layer upon each facet and, in addition, a coating of totally reflecting material upon the complete outer surface of the solid to confine all reflections of the light rays substantially wholly within the body.

WILLIAM C. EDDY.